United States Patent [19]

Masina

[11] Patent Number: 4,811,282

[45] Date of Patent: Mar. 7, 1989

[54] RETIMING CIRCUIT FOR PULSE SIGNALS, PARTICULARLY FOR MICROPROCESSOR PERIPHERALS

[75] Inventor: Vittorio Masina, Corporeno, Italy

[73] Assignee: SGS Mircroelettronica SpA, Catania, Italy

[21] Appl. No.: 943,199

[22] Filed: Dec. 18, 1986

[30] Foreign Application Priority Data

Dec. 18, 1985 [IT] Italy ................................ 23254 A/85

[51] Int. Cl.⁴ ............................................. G06F 9/00
[52] U.S. Cl. ...................................................... 364/900
[58] Field of Search ................................. 364/200, 900

[56] References Cited

U.S. PATENT DOCUMENTS 4,327,442 4/1982 Athenes ................................ 328/63
4,387,341 6/1983 Martinson ........................... 364/569
4,583,007 4/1986 Paski ..................................... 328/164

Primary Examiner—Gareth D. Shaw
Assistant Examiner—John G. Mills
Attorney, Agent, or Firm—Wenderoth, Lind & Ponack

[57] ABSTRACT

A digital retiming circuit for synchronizing a pulse signal with a local clock aligns incoming pulse signals with the local clock using a fully digital technique. The incoming signal is stored in a storage circuit which is disabled until the pulse signal has gone low before rising again. The output of the storage circuit is used to trigger a flip-flop, whose output is converted into a signal aligned with the local clock by means of a cascade of inverters and transfer gates enabled by the local clock. A trigger circuit resets the flip-flop in step with the clock whenever the incoming pulse signal is low.

7 Claims, 3 Drawing Sheets

RETIMING CIRCUIT FOR PULSE SIGNALS, PARTICULARLY FOR MICROPROCESSOR PERIPHERALS

BACKGROUND OF THE INVENTION

The present invention relates to a retiming circuit for pulse signals, exchanged between a transmitter device (typically a microprocessor) and a receiving device (typically a peripheral). In particular, the circuit is intended to be built-in into a peripheral produced with integrated technology.

To interface the microprocessors with the outer environment, the use is known of asynchronous communication circuits, employed as peripherals having the task of receiving pulse signals from the outer environment, arriving at arbitrary times, and synchronizing said asynchronous signals with the microprocessor, i.e. recovering them so as to feed them to the microprocessor as pulses strictly correlated to the clock waveform edges of the microprocessor itself. The asynchronous communication circuit is generally also assigned to the task of transferring synchronous signals produced by the microprocessor towards the asynchronous outer environment.

In other cases, the signals generated by the microprocessor must be fed to a synchronous communications line, or to another microprocessor, and therefore must be provided with a synchronism of their own, which however differs from the one of the transmitting microprocessor. For this purpose, communication circuits or interfaces of the synchronous type are used, and thus it becomes necessary to make a distinction between different clocks, i.e. between the clock of the microprocessor, or main clock, and the local clock of the circuit or transfer gate.

Naturally, the pulse signals to which reference is made may be composed not only of a single line, but even, and indeed most often, of groups of signals in parallel, e.g. of an octet of lines which at each transfer supply one byte of information, and which all together constitute the event to be retimed. Obviously, the same retiming circuit or gate can simultaneously process in parallel all the signals of the group.

In performing their timing or retiming function, the interface circuits must naturally ensure the correct recognition of the signals, i.e. they must avoid both the inadvertent skipping of an event and the reading of the same event two or more times (thus generating nonexistent signals). Such situations could occur, e.g., in the absence of appropriate circuital provisions, in the first case due to a read-out with an excessively low frequency, and in the second in the case of a read-out with an excessively high frequency.

In order to solve the above described problems, up to now retiming gates have been used which require several phases of the clock to complete the process of recognizing and regenerating an event and to be again ready to receive a new event. Furthermore, known synchronizing gates, in order to operate correctly, must operate in synchronism with the main clock. Finally, known gates are generally based on analog operating concepts, and this can some times lead to problems of implementation in otherwise fully digital circuits.

SUMMARY OF THE PRESENT INVENTION

The aim of the present invention is to provide a timing or retiming circuit in fully digital technology.

Another object is to provide said circuit so that it is capable of operating with a local clock which is separate from the clock of the microprocessor.

Another object is to provide said circuit so that it may operate at frequencies which are higher than those possible with the synchronizing circuits of the prior art.

Still another object is to provide said circuit in a form which is less complex than that of the synchronizing circuits of the prior art.

These aims are achieved by the invention, together with other objects and advantages such as will become apparent hereinafter, with a retiming circuit for a pulse event or signal with a local clock signal, particularly for peripherals of microprocessors, characterized in that it comprises:

(a) a storage circuit provided with an enabling input driven by said event to be retimed and with at least one reset input, and with one output suitable for being enabled by turning on the enabling input, remaining enabled until the reset input is not turned on;

(b) a flip-flop having a normally negated output connected, under the control of a first transfer gate, to the input of a first inverter, the drop and the subsequent re-enabling of the output of this first inverter constituting a first signal retimed on its terminal edge;

(c) a trigger circuit controlled by said event to be retimed, by the output signal of said first inverter, and by the local clock signal, to cause the normal pulsing of an output line with the period of the local clock signal, disabling said output line while said event is present, said output of the trigger circuit being combined with the output of the storage circuit in a NAND gate which controls the switching of the flip-flop output when both its inputs are enabled;

(d) a control circuit for said first transfer gate, controlled at least by said output of said flip-flop and by the local clock signal, suitable for enabling said first transfer gate only after the output of the flip-flop has been enabled for a period of time sufficient to ensure the actual occurrence of the switching of the flip-flop, the enabling of said first transfer gate terminating with a local clock signal edge; and (e) a reset circuit for the flip-flop, driven by at least said event to be retimed and by said first retimed signal, suitable for resetting the flip-flop subsequently to the drop and before the subsequent re-enabling of the output of the first inverter.

BRIEF DESCRIPTION OF THE DRAWINGS

A preferred embodiment of the invention, given only by way of non-limitative example, will now be described with reference to the accompanying drawings, where.

DESCRIPTION OF THE PREFERRED EMBODIMENTS

Since, as usually occurs in the art, normal and inverted forms of a same signal, i.e. low rest signals and high rest signals, are often present in the circuits being described, hereinafter an asterisk will indicate the negated signals, i.e. the rest true signals. Furthermore, it shall be supposed, for the sake of simplicity, that a signal is 0 (i.e. at ground voltage) when it is negated, and that it is 1 (i.e. at high voltage, that is to say substantially at the level of the power supply) when it is true, while it is understood that the same principles apply to the opposite convention.

Figure 1:
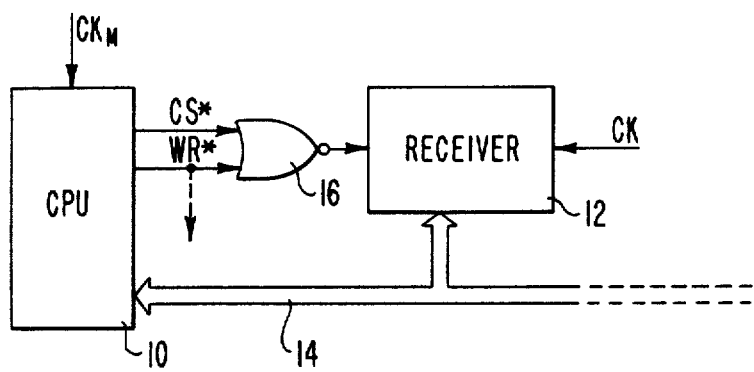
FIG. 1 is a block diagram of a connection between a microprocessor and a peripheral, in which the retiming circuit according to the invention can typically find an application.

FIG. 1 illustrates a typical situation in which the problem object of the invention occurs. A microprocessor 10 (which constitutes the transmitter) transmits to a receiver 12 (such as a peripheral or interfacing device) a control pulse WR*, or write-enable signal, which constitues for the same receiver an indication that data is available, directed towards it, on a bus 14. Since both the WR* line and the data bus are generally connected to other peripheral devices such as memories, displays, etc., the microprocessor 10 simultaneously sends a peripheral selection signal CS* (chip select) which is usually combined into a single enabling signal or strobe WSTR in an NOR gate 16.

A clock signal $CK_M$ sets the timing of the operation of the main transmitter, while the peripheral 12 is timed by a clock signal CK. In many applications, the clock of the peripheral is the same as the one of the main transmitter, but generally the two clocks can be separate, and the present invention addresses itself to this more common case, though it can be naturally applied also in the case of a single clock.

The WSTR impulse, synchronized with the clock of the microprocessor, therefore constitutes the event to be retimed with the clock of the peripheral. This retiming therefore consists of converting the WSTR event (asynchronous as seen by the peripheral) into a fixed-duration pulse (at least equal to one clock period) no matter what the duration of the original signal, with at least one of the raising or falling edges coupled to a transition of the clock subsequent to the beginning of the event.

An opposite but similar case (not illustrated in the Figures) occurs when the microprocessor sends a read-out signal RD*, with which it asks the peripheral for the access of the bus to the data present in a data register of the peripheral itself.

Naturally, the term "data", in this context, must be understood also in the sense of a control word suitable for altering internal operating parameters of the peripheral, or for starting a process in the peripheral.

Figure 2:
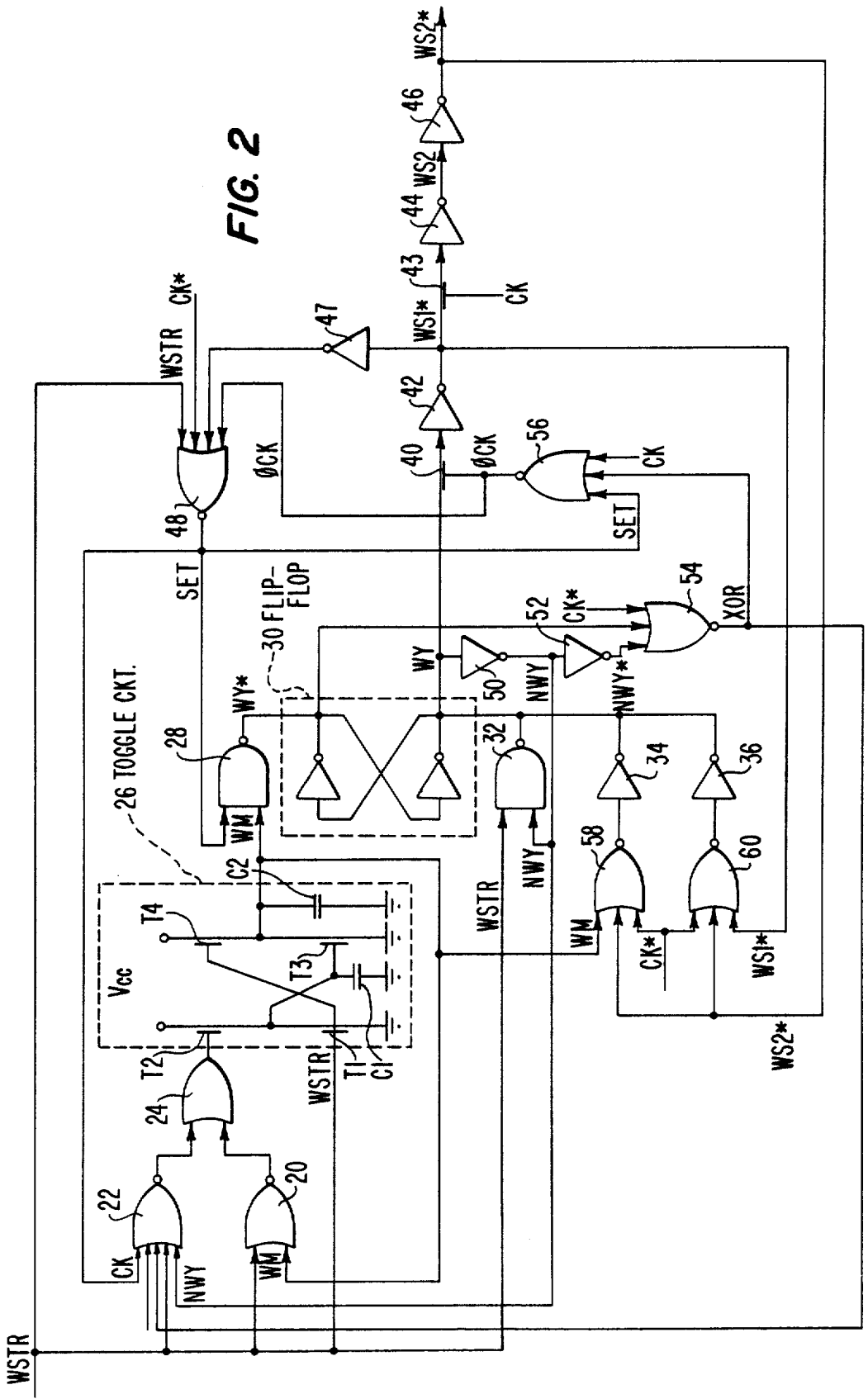
FIG. 2 is a circuit diagram of a preferred embodiment of the retiming circuit according to the invention.

With reference to FIG. 2, a preferred embodiment of a timing or retiming circuit according to the invention will now be described, the application of said circuit in the context of a peripheral, as illustrated in FIG. 1, being obvious for the expert in the field.

The retiming circuit according to the preferred embodiment of the invention comprises first of all a storage circuit composed essentially of two NOR gates 20, 22, each having an input driven by the pulse signal WSTR to be retimed, e.g. by the strobe signal of FIG. 1, of an OR gate 24 which receives the outputs of the two NOR gates 20, 22, and of a toggle circuit 26 composed of four transfer gates T1, T2, T3 and T4, in series two by two between a voltage supply $V_{CC}$ and the ground. The transfer gate T1 is driven by the output signal of the OR gate 24, while the transfer gate T2, in series therewith, together with the transfer gate T4 of the other pair, are driven by the same original signal WSTR. The transfer gate T3 is connected to the common node of the transfer gates T1 and T2 of the first pair, and the common node between T3 and T4 constitutes an output WM which returns in feedback as an input signal to the NOR gate 20. Preferably, a capacitor C1 is connected between the control electrode of the transfer gate and the ground, and a similar capacitor C2 is connected between the ground and the output of the circuit.

The output line WM of the toggle circuit 26 is taken to the input of the NOR gate 20, and furthermore constitutes one of the two inputs of a NAND gate 28, the output WY* of which drives a flip-flop 30 (formed in a conventional manner by two inverters in mutual negative feedback), the other input of which shall be considered hereinafter. On the straight terminal WY of the flip-flop 30 the outputs of a NAND gate 32 and of two inverters 34, 36, which are part of a reset circuit of the flip-flop 30 which will be described hereinafter, also converge in "wired-OR".

The straight output WY of the flip-flop 30 is applied to an inverter 42 by means of a transfer gate 40, to obtain an output WS1*, which, by means of another transfer gate 43, reaches the input of a further inverter 44 to supply an output WS2, which is preferably again inverted in the inverter 46 to obtain also the negated form WS2* of said signal. As will be understood hereinafter, the signal WS1*, and in a more complete manner the signals WS2 and WS2*, constitute the events retimed on the local clock.

The signal WS1* is furthermore applied to another inverter 47, the output of which drives an NOR gate 48, which also receives as inputs the original signal WSTR and the negated form CK* of the local clock signal CK of the device with which the retiming circuit cooperates. The output SET of the NOR gate 48 constitutes the second input of the NAND gate 28 described above.

To drive the transfer gate 40, the circuit comprises an inverter 50 controlled by the signal WY to supply its negated form NWY (which, for the purposes of the present description, is distinguished from WY* by a slight added delay in propagation, and that, as will be seen, is useful for the operation of the circuit), and another inverter 52 which re-inverts NWY to supply an input to an NOR gate 54, a second input of which is composed of the negated clock CK* already described above. A third input to the NOR gate 54 is given by the same signal WY*.

The XOR output of the NOR gate 54 forms one of the inputs of another NOR gate 56, also driven by the SET signal described above, as well as by the clock CK, this time in a straight form. The output 0CK of the NOR gate 56, which, as will become apparent hereinafter, is a slightly modified form of the same clock CK*, is indeed the control signal for the transfer gate 40. The signal 0CK is furthermore preferably applied also as a fourth input of the NOR gate 48 which generates the SET signal described above.

The transfer gate 43, instead, is controlled directly by the clock signal CK.

Returning to the NAND gate 32, it is controlled by the two signals WSTR and NWY. Regarding the inverter 34, it is driven by an NOR gate 58, the inputs of which are the signals WM, WS2* and CK*. Finally, the inverter 36 is driven by an NOR gate 60 the inputs of which are the signals WS1*, WS2* and CK*.

Finally, as appears from the Figure, the NOR gate 22 at the input of the storage circuit is driven by the initial-control signal WSTR and by the signals NWY, XOR, SET and CK.

Figure 3:
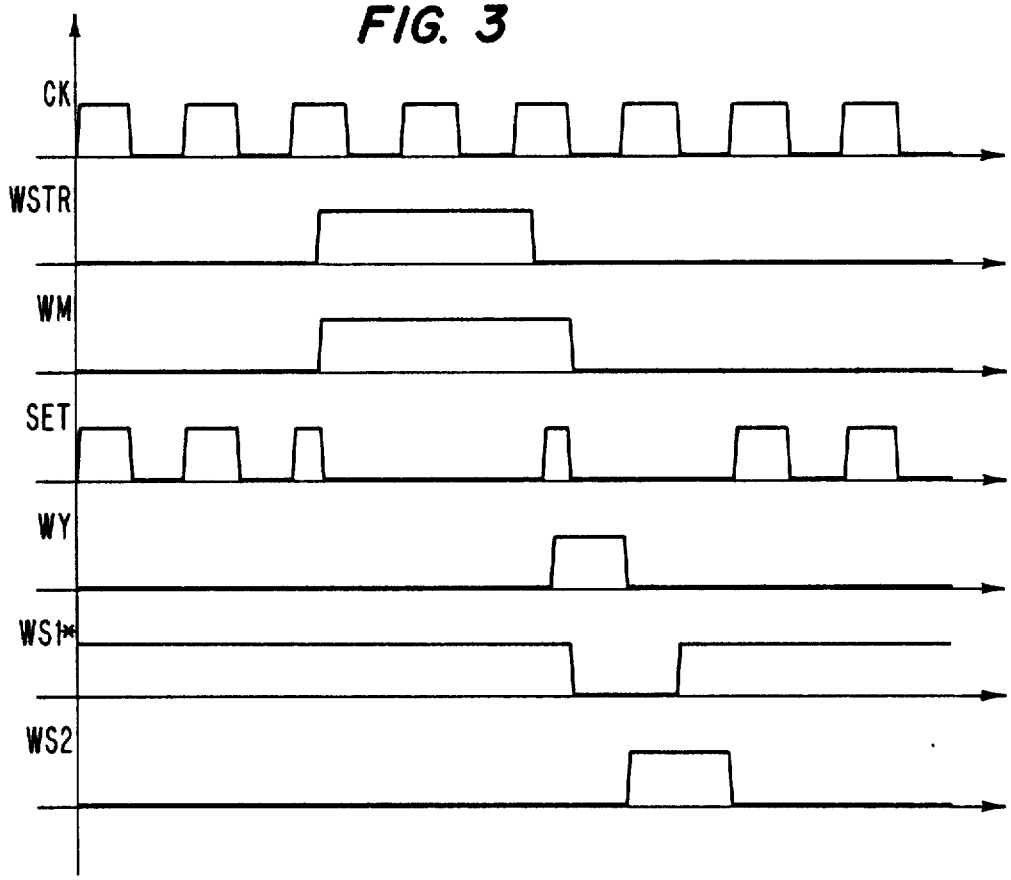
FIG. 3 is a group of waveform diagrams of various signals present during the operation of the circuit of FIG. 2.

The configuration of the retiming circuit according to the preferred embodiment of the invention having thus been described, the operation of the same shall now be described, also with reference to the diagrams of FIG. 3.

Consider at first the idle circuit, with WSTR=WM=0. In such idle circumstances, WY=0, NWY=1, WS1*=WS2*=1 and WS2=0 will also occur, as will be seen by tracing the paths of the various signals. In fact, the output of the gate 24 will be high, since the output of the gate 20 is, too. The signal SET oscillates in time with the clock, but WM is always low, therefore WY* is high, and WY is accordingly low. The signal XOR is low, due to the presence of WY*, which in this situation is high, at the input of the NOR gate 54. Therefore, in the absence of interventions from outside, the conditions of the various signals described above will necessarily remain stable.

If the signal to be retimed WSTR now occurs, it can be seen that as the raising edge appears the gate 22 does not change status (NWY=1), but the output of the NOR gate 20, which was high, becomes low, and so does the OR gate 24. Simultaneously, the signal WSTR also goes directly to the transfer gate T4, forcing to 1 the line WM. By virtue of the feedback of WM on the input of the gate 20, this new status is stably maintained even after the drop of WSTR (in the absence of any other intervention on the gates 20, 22). In other words, the circuit 20, 22, 24, 26 constitutes a storage or enabling circuit, which prolongs the effects of the appearance of the signal WSTR, regardless of its duration.

The time of the appearance of the raising edge of WSTR (which is hypothetically asynchronous with respect to the local clock CK) is irrelevant for the storage circuit, since the clock CK does not intervene in its operation.

The appearance of the raising front of the signal WSTR, which is also applied to the NOR gate 48, also resets to zero the signal SET, which previously pulsed in phase with CK. Therefore the status of the NAND gate 28, despite the presence of the high signal WM, does not change, and the signals WY and WY*, and generally the status of all the downstream circuit, in particular the signals WS1, WS2 and their negates, remain the same as before, i.e. with WY=WS2=0, WY*=WS1*=1.

However, when the signal WSTR (which follows the timing of the clock of the transmitter, and therefore is asynchronous with respect to the clock CK of the circuit of FIG. 2), drops back to zero, the signal WM stays high, as has already been described above, but the SET signal again starts to pulse according to the timing imposed by CK* and 0CK, while the signal WM is still present. The consequence of this is that WY* and WY, too, can change status. Since however the drop of WSTR occurs in a random instant, the first impulse which reappears in the SET signal (which in practice is a modified clock) may not be reliable. If the passage to zero of WSTR occurs in the interval between two pulses of the clock, the first impulse of SET will be formed perfectly, but if the transition occurs during a pulse of the clock CK, the first pulse of SET may be truncated in various manners, and it cannot be foreseen if it will be able to switch the flip-flop 30.

In any case, if the first pulse of SET does not manage to switch the flip-flop, the second one certainly does. Therefore, at the latest within a little more than one clock pulse after the drop of WSTR, the signal WY certainly becomes high, and so does NWY*, which repeats it with a slight delay. The signal XOR, therefore, becomes low regardless of the course of the negated clock CK* at the input of the NOR gate 54, and allows 0CK to go high, enabling the transfer gate 40, during the zero intervals of the signals CK and SET. It is obvious that, by virtue of the delay in propagation along the inverters 50, 52 and the NOR gates 54, 56 this situation can only occur after the flip-flop 30 has been certainly switched. Indeed, a possible transient fluctuation of WY*, not confirmed by a definite enabling of WY, can at the most give rise to a spike of XOR, which may briefly disable the transfer gate 40, without any practical effect on the downstream circuit.

The signal WY, now true, thus reaches the input of the inverter 42, the output WS1* of which (normally high) now becomes low. The time of the transition to zero of the signal WS1* is not predictable 'a priori', since it depends on the instant at which the switching of the flip-flop 30 occurs, which is hypothetically asynchronous with respect to the clock CK. However, the next (re)enabling of the transfer gate 40 will bring the signal WS1* back high with a raising edge exactly coinciding with a falling edge of the signal 0CK. Therefore, the signal WS1* will have a raising edge synchronized with the local clock. The action of the transfer gate 43, controlled by the clock CK, will then be to create at the output of the inverter 44 a pulse exactly synchronized with the clock CK, both on its raising front and on its falling front, separated from each other by one period. The inverter 46 only has the purpose of making the negated form WS2* of this impulse available as well. The signals WS2 and WS2* are therefore fully synchronized, one reversed with respect to the other.

The raising of WS1* also causes the output signal from the inverter 47 to disappear from the input of the gate 48. Therefore, the set signal starts to pulse again, returning to conditions identical to those preceding the appearance of WSTR.

Another event following the generation of the synchronized signals WS1*, WS2* is the appearance of high signals at the inputs of the inverters 34 and 36, with the drop of their outputs, while the output of the NAND gate 32 has already gone to zero due to the disappearance of WSTR. Therefore the flip-flop 30 is forced to switch again, and the line WY goes low again. The signal NWY becomes high and causes the output line of the NOR gate 22 to return high, which gate, through the OR gate 24, forces the circuit 26 to the initial conditions, with WM=0. The subsequent restoring of the signals WS1*, WS2, WS2* to the initial conditions no longer changes anything in the status of the circuit.

The entire circuit has thus returned to the initial conditions, and is preset to receive a new WSTR signal.

For redundance, to the NOR gate 22, besides the signal NWY, which is the only one theoretically necessary for correct operation, the signals CK, SET and XOR are also applied, which only have the aim of better protecting the operation of the circuit from transient fluctuations due to possible interferences and the like.

It has thus been seen that the original signal WSTR, appeared in an asynchronous instant, has given rise to the generation of synchronized pulses WS1*, WS2, WS2*. The entire process has in practice taken place within a little over one period of the clock CK, and the circuit is now again ready to receive and synchronize a new event. The maximum allowable frequency of the signal WSTR can thus be safely equal to half the frequency of the clock.

As has been seen, the circuit is provided with fully digital technology. Considerations of an analog type only occur in the switching of the flip-flop 30, but in a manner which is irrelevant as far as the designing is concerned, since the analog response of the flip-flop 30 has no consequence on the operation of the circuit, except that of slightly anticipating or delaying the generation of the synchronized signal, and this for a lapse of time no longer than one period of the clock.

Figure 4:
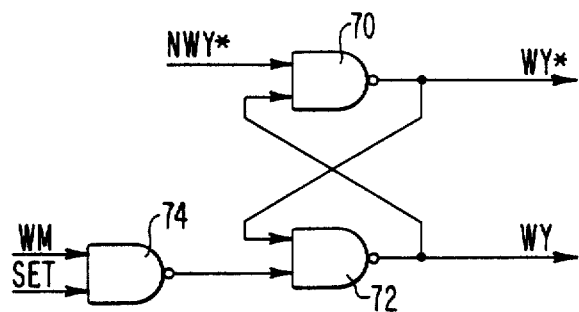
FIG. 4 is a circuit diagram of another form of flip-flop which can be used in the circuit of FIG. 2.

FIG. 4 illustrates a different, more sophisticated form of flip-flop which can be used in place of the flip-flop 30 of FIG. 2, and is suitable for ensuring faster switching and generally a more rigorous behaviour. The flip-flop 30' comprises, instead of the two inverters of FIG. 2, a NAND gate 70 and a NAND gate 72 in mutual negative feedback, the outputs of which respectively constitute the signals WY*, WY. The NAND gate 70 receives on one input the signal NWY*, which acts as an enabling signal, which since it is a slightly delayed copy of WY, has the effect of selecting the pulses of SET, accepting only the most severe or safe ones.

The second input of the gate 72 is driven by another NAND gate 74, driven by the same signals WM and SET which control the gate 28 of FIG. 2. This has the effect of anticipating the SET signal, thus making the flip-flop switch faster.

Figure 5:
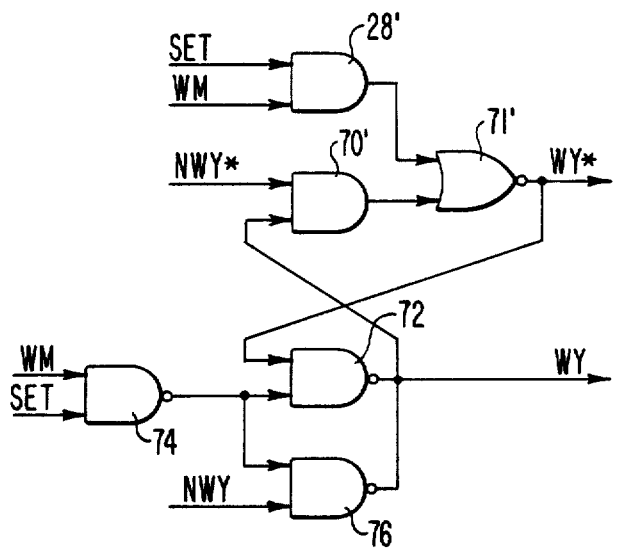
FIG. 5 is a diagram of a further improvement of the flip-flop of FIG. 4.

FIG. 5 illustrates a further improvement of the flip-flop of FIG. 4. The flip-flop still has the same essential configuration as in FIG. 4, but the NAND gate 70 of FIG. 4 is replaced herein by the cascade arrangement of an AND gate 70' and of an NOR gate 71'. The second input of the NOR gate 71' is driven by the output of an AND gate 28' which replaces the NAND gate 28 of FIG. 2, and is controlled by the same signals WM and SET.

The second branch of the flip-flop of FIG. 5 still comprises the same NAND gates 72 and 74 of FIG. 4, to which a NAND gate 76 is however furthermore added, arranged "wired-OR" with the gate 72, and having as inputs on one side the signal NWY, on the other the output of the NAND gate 74 described above. The presence of this further element has the effect of holding WY clamped to zero, without the presence of the SET signal.

The various improvements and solutions adopted in the circuits of FIGS. 4 and 5 are independent from one another and can naturally be used both individually and in combination.

In the circuit described above and in its variations of FIGS. 4 and 5, the usual redundancies and precautions have been adopted, which are suitable to better ensure its correct operation even in the presence of intrinsic anomalous effects of the components or caused by external disturbances, according to largely empirical considerations, which in any case are not part of the basic concepts of the invention. Therefore, in the described preferred embodiment of the circuit according to the invention, several connections and components can be eliminated, e.g. the capacitors C1, C2, as well as several inputs on some gates, without thereby abandoning the scope of the invention. Even the shape of some components can be altered, e.g. the manner of providing the storage circuit. Finally, it is evident that, though in the entire description reference has been made to signals defined in positive logic, the entire circuit may be redesigned for signals in negative logic without abandoning the scope of the invention.

I claim:

1. A digital retiming circuit for synchronizing a pulse signal with a local clock, comprising:
   (a) storage circuit means having a setting input for receiving the pulse signal, at least one resetting input, and an output, said storage circuit means providing a first logic level output when said setting input is at said first logic level, and providing a second logic level output when said resetting input is at said first logic level;
   (b) a first NAND gate having a first input connected to said output of said storage means, a second input, and an output;
   (c) a first inverter having an input and an output;
   (d) a flip-flop means having a first and a second input, said first input being connected to said output of said first NAND gate, and having a first output normally having said first logic level and having a second output normally having said second logic level output, the latter being connected, through a first transfer gate having an enabling input, to said input of said first inverter;
   (e) a trigger circuit comprising a first logic array having a first input driven by the pulse signal, a second input driven by the local clock, a third input connected to said output of said first inverter, and an output connected to said second input of said first NAND gate and to said resetting input of said storage means, said first logic array being arranged such that its output signal is a complemented sum of the pulse signal, and the complemented clock, and the complemented output signal of said first inverter;
   (f) a control circuit for said first transfer gate, comprising a second logic array having a first input connected to said second output of said flip-flop means and a second input connected to said first output of said flip-flop means, a third input connected to said output of said trigger circuit, and an output connected to said enabling input of said first transfer gate, said second logic array being arranged such that its output signal is a product of said output signal of the trigger circuit multiplied by a sum of said first output of said flip-flop means and of a delayed version of said second output of said flip-flop means;
   (g) a reset circuit for said flip-flop means, comprising a first NOR gate having at least a first input connected to said output of said storage means and a second input connected to said output of said first inverter, and an output, and a second inverter having an input connected to said output of said first NOR gate and an output connected to said second input of said flip-flop means.

2. The retiming circuit of claim 1, further comprising a third inverter and a second transfer gate connected between said output of said first inverter and said input of said second inverter, said second transfer gate having an input controlled by the local clock.

3. The retiming circuit of claim 2, wherein said control circuit for said first transfer gate comprises fourth and fifth inverters connected in cascade, an input of said fourth inverter being connected to said second output of said flip-flop means, a second NOR gate driven by an output of said fifth inverter and by a negated clock signal, and a third NOR gate driven by said output of said trigger circuit, an output of said third NOR gate being an output signal of said control circuit.

4. The retiming circuit of claim 3, wherein said first NOR gate has a further input driven by said output signal of said first NAND gate.

5. The retiming circuit of claim 1, wherein said reset circuit further comprises a second NAND gate having an output which is OR connected with said output of said second inverter and at least two inputs which are respectively driven by said pulse signal and by said output of said first inverter.

6. The retiming circuit of claim 3, wherein the storage circuit means comprises:
(a) a toggle circuit having an output comprising said output of said storage circuit means, a setting input driven by said pulse signal, and a resetting input;
(b) a fourth NOR gate means having an output connected to said resetting input of said toggle circuit, and at least a first input driven by said pulse signal, and a second input driven by said output of said toggle circuit.

7. The retiming circuit of claim 6, wherein said storage circuit means further comprises a fifth NOR gate means having an output which is OR-connected with said output of said fourth NOR gate means, and at least a first input driven by said pulse signal, a second input driven by said output of said fourth inverter, and a third input driven by said output of said trigger circuit.

* * * * *